United States Patent Office 3,156,741
Patented Nov. 10, 1964

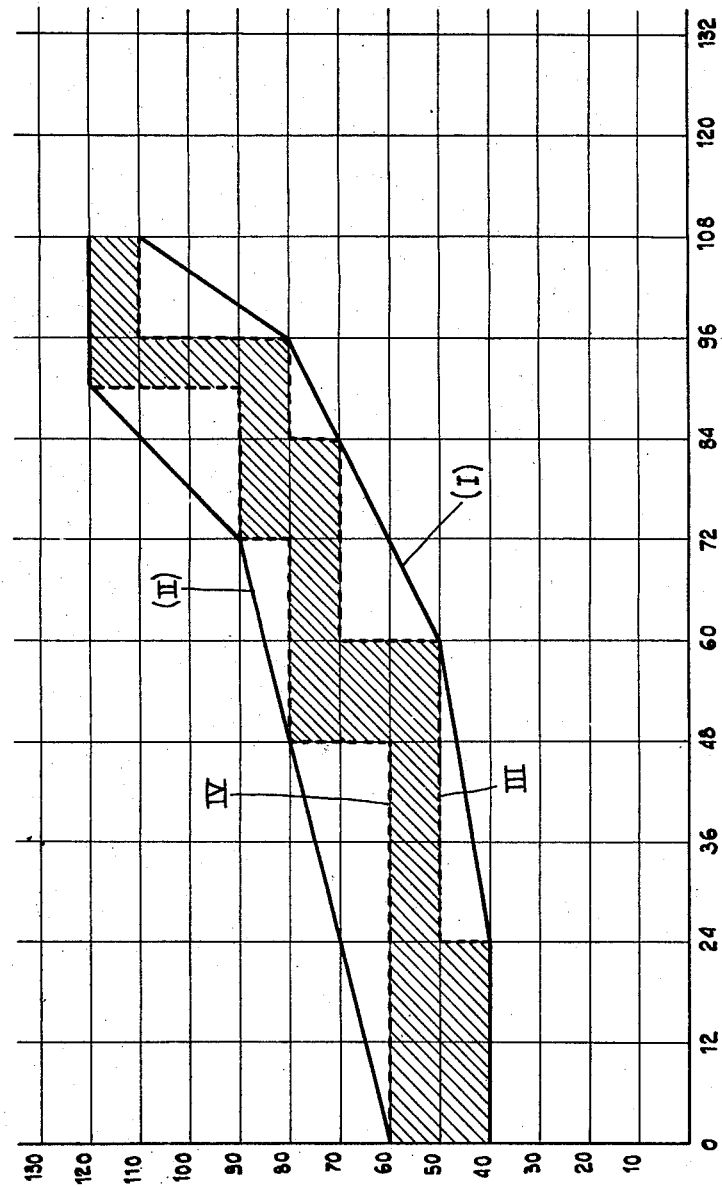

3,156,741
COPOLYMERS OF STYRENE, DIMETHYL ITA-
CONATE AND ACRYLONITRILE AND A PROC-
ESS FOR THEIR MANUFACTURE
Giuseppe Messina, Limbiate, Nicola de Pisapia, Milan, Levio Spano, Cesano Maderno, and Emanuele Condurelli, Milan, Italy, assignors to L.I.R.C. Laboratori Italiani di Ricerca Chimica, Milan, Italy, a joint-stock company of Italy
Filed Nov. 17, 1959, Ser. No. 853,542
Claims priority, application Italy, Jan. 12, 1959, Patent 601,904; Oct. 21, 1959, 17,451/59; Oct. 23, 1959, 17,661/59
10 Claims. (Cl. 260—881)

This invention relates to copolymers and to a process for making the same.

The copolymers according to the invention are broadly characterized in that they are the copolymerization products of a styrene-dimethyl itaconate mixture, wherein the styrene is present in amounts ranging from 30 to 90 percent by weight, and preferably from 55 to 77 percent, while methyl itaconate is present in amounts ranging from 70 to 10 percent by weight, and preferably from 45 to 23 percent. The optimum ratio is: styrene 62.5 percent/dimethyl itaconate 37.5 percent.

According to a particular form of the invention, the copolymers are the copolymerization products of the aforesaid mixture together with acrylonitrile, this latter being present in an amount from 1 to 30 percent, and preferably, from 5 to 10 percent, calculated on the overall weight of monomers. All parts and percentages in this specification are by weight.

It is known that both styrene and dimethyl itaconate can be separately polymerized. Styrene gives a transparent polymer with good chemical and electric properties, which has found many practical applications. However, it is somewhat brittle and its mechanical properties are not very good. On the other hand, dimethyl itaconate gives a very brittle and friable polymer. Thus, the fact that the copolymers of styrene and dimethyl itaconate defined above have properties superior to those of polystyrene from the view point of mechanical strength and reduced brittleness is wholly unexpected and surprising. In addition, said copolymers are more transparent than polystyrene itself.

The extrusion and injection-molding of said copolymers can be accomplished more easily than even those of polystyrene.

The ternary copolymers obtained from styrene, dimethyl itaconate and acrylonitrile have further surprising advantages.

They are characterized mainly by very good resistance to solvents of the benzene type. Thus, for instance, while a binary copolymer, when tested for resistance to a mixture of gasoline with 15 percent of benzene, quickly becomes opaque, the ternary copolymer is not attacked by said mixture and remains clear and transparent.

Moreover, an improvement in a number of mechanical properties is obtained, such as in the impact bending strength, and resistance to traction, bending and compression.

The process according to the invention for making said copolymers is broadly characterized in that the monomer mixture in the stated proportions is block polymerized by a period from about 24 hours to a few days, at temperatures in the range of 60°–150° C, and preferably of 60°–90° C, preferably in the presence of catalysts, such as organic peroxides or hydroperoxides in amounts ranging between about 0.05 and 1 percent. The lauryl-, or benzoyl-peroxides are the most suitable for said purpose. Other possible catalysts are, for instance: the chloro-benzoyl peroxides, azodiisobutyronitrile, tertiary butyl permaleinate, cyclohexanone peroxide, and methylethylketone hydroperoxide.

When copolymerizing styrene-dimethyl itaconate-acrylonitrile mixtures, it is preferred to adopt a temperature diagram which will be defined hereinafter by graphical means.

According to a preferred form of the invention an amount of previously prepared copolymer is added to the mixture of monomers before polymerization. Said amount is in the range of 2 to 20 percent and preferably 3 to 10 percent of the overall weight of the mixture of monomers and added polymer. This addition does not alter the process in any other way, but has many advantageous effects.

First of all, the polymerization time is materially decreased, and is practically halved, all other conditions being equal to obtain a copolymer of the same relative viscosity.

Further, the volatile matter content of the polymer is also materially decreased. Such a decrease is very important, since gas pockets are formed by such volatile matter when the polymer is processed, thereby impairing the transparency of the finished products and lowering their mechanical properties. By operating according to said particular form of the invention, the volatile matter content can be reduced, for instance, from 3 to 4 percent (as obtained when the monomer mixture only is copolymerized) to 2 to 2.5 percent. Moreover, the volatile matter content can be further reduced to 0.5 to 1 percent by effecting the polymerization in the preferred range of 60°–90° C. and subsequently heating the product for a few hours at a temperature higher than 100° C.

Finally, the copolymers obtained by the polymerization of a mixture of monomers containing a previously prepared copolymer have better mechanical-physical properties, as will be seen hereafter.

The invention will be better understood from the following examples.

EXAMPLE 1

375 parts of dimethyl itaconate are mixed with 625 parts of styrene, commercial grade. 0.5 part of benzoyl peroxide is then added. The resulting mixture is poured into a suitable container, which is then dipped into a water bath thermostatically controlled at 70° C., and left therein through four days. After this time, a copolymer with a melting point of 155°–158° C. and a relative viscosity of 2.8 (2 percent solution in dimethylformamide) is obtained.

EXAMPLE 2

375 parts of dimethyl itaconate are mixed with 625 parts of styrene, commercial grade, and 2.25 parts of lauryl peroxide are then added. The resulting mixture is poured into a suitable container, which is then dipped into a water bath thermostatically controlled at 70° C. After four days, a copolymer with the same properties of that resulting from Example 1 is obtained.

EXAMPLE 3

The polymerization is carried out as in Example 1, using the same amounts of monomers, except that no catalyst is added. The water bath temperature is 140°–150° C. The mixture is left in said water bath for two days. After this time, a copolymer with M.P. 125°–135° C. and relative viscosity 1.5 is obtained.

EXAMPLE 4

The polymerization is carried out as in Example 1, but 230 parts by weight of dimethyl itaconate and 770 parts by weight of commercial grade styrene are used.

A copolymer with M.P. 160°–165° C. and relative viscosity 2.9 is obtained.

EXAMPLE 5

The polymerization is carried out as in Example 1, but 450 parts by weight of dimethyl itaconate and 550 parts by weight of commercial grade styrene are used. A copolymer with M.P. 155°–160° C. and relative viscosity 2.35 is obtained.

EXAMPLE 6

The polymerization is carried out as in Example 1, but 550 parts by weight of dimethyl itaconate and 450 parts by weight of commercial grade styrene are used. A copolymer with M.P. 155°–160° C. and relative viscosity of 2.2 is obtained.

EXAMPLE 7

The polymerization is carried out as in Example 1, but 700 parts by weight of dimethyl itaconate and 300 parts by weight of commercial grade styrene are used. A copolymer with M.P. 150°–155° C. and relative viscosity of 1.8 is obtained.

EXAMPLE 8

The polymerization is carried out as in Example 1, but 100 parts by weight of dimethyl itaconate and 900 parts by weight of styrene, commercial grade, are used. A copolymer with M.P. 165°–170° C. and relative viscosity 3 is obtained.

The surprising properties of the copolymers obtained are shown in Table I, wherein the properties of a copolymer obtained from 62.5 percent of styrene and 37.5 percent of dimethyl itaconate are compared with those of a standard polystyrene.

*Table I*

|  | Copolymer according to the invention | Standard polystyrene |
|---|---|---|
| Specific weight | 1.14 | 1.06 |
| Rockwell hardness, ASTM D785 | M 85 | M 90 |
| Compressive strength, ASTM D695, kg./sq. cm | 830 | 875 |
| Tensile strength, ASTM D638 | 435 | 290 |
| Bending strength, ASTM D790 | 840 | 495 |
| Softening point according to Vicat, ASTM D1525, ° C | 92 | 88 |
| Relative viscosity (2 percent solution in dimethyl formamide) | 2.2–2.8 | 3.2 |
| Melting point, ° C | 150–180 | 175–180 |
| Refractive index, ASTM D542 | 1.559 | 1.56 |

The preparation of ternary copolymers from styrene, dimethyl itaconate and acrylonitrile is illustrated in Examples 9 and 10, with reference to the attached diagram and in Table II.

EXAMPLE 9

A monomer mixture consisting of 40 kg. of dimethyl itaconate, 55 kg. of styrene and 5 kg. of acrylonitrile (for instance with a 5 percent addition of acrylonitrile) is taken as starting material. 500 g. of lauryl peroxide (0.5 percent calculated on the weight of mixture) are added to said mixture and after dissolution of catalyst, the mixture is transferred into suitable containers, which are then dipped into a thermostatically controlled water bath. In this example the polymerization diagram is as follows:

36 hours of heating at 50° C.
12 hours of heating at 60° C.
24 hours of heating at 70° C.
24 hours of heating at 90° C.
7 hours of heating at 110° C. and 120° C.

A transparent, pale-yellow colored polymer is obtained.

EXAMPLE 10

A mixture of 30 kg. of dimethyl itaconate, 60 kg. of styrene and 10 kg. of acrylonitrile (for instance with 10 percent of acrylonitrile) is taken as starting material and 1 kg. (1 percent) of lauryl peroxide is dissolved therein.

The resulting mixture is subdivided into suitable containers, and processed according to a temperature diagram similar to that of Example 1. A transparent, slightly yellow colored polymer is obtained.

The polymerization diagram of the previous example is given only as an example. Any other temperature diagram, included between the broken lines (I) and (II) in the attached diagram, and preferably falling within the hatched area defined by the broken lines (III) and (IV) might be selected. Said area is open to the right, since an additional heating of the order of hours is not substantially harmful in general.

In the diagram, the times (in hours) are marked on the abscissae, while the temperatures (in ° C.) are marked on the ordinates.

Table II shows the properties of a copolymer made according to Example 9 and a copolymer made according to Example 10 compared to those of a binary copolymer (37.5 percent of dimethyl itaconate and 62.5 percent of styrene).

The methods employed are stated in Table II.

*Table II*

|  | Method | Unit | Ternary copolymer Example 9 | Ternary copolymer Example 10 | Binary copolymer |
|---|---|---|---|---|---|
| Relative viscosity (0.5% concentration) | Dimethylformamide solution | | 1.32 | 1.40 | 1.25 |
| Melting index | ASTM D1258 | Gr./10′ | 0.10 | 0.11 | 0.2 |
| Heat distortion temperature (66 p.s.i.) | ASTM D648 | ° C | 97 | 95 | 95 |
| Vicat softening point | ASTM D1525 | ° C | 107 | 107 | 92 |
| Specific weight | ASTM D792 | Kg./cu.dm | 1.14 | 1.122 | 1.14 |
| Refractive index | ASTM D542 | $N_D 20$ | 1.54 | 1.535 | 1.559 |
| Transparence | Spectrophotometric | Percent | 84 | 82 | 85 |
| Rockwell hardness | ASTM D785 | M scale | 85 | 90 | 85 |
| Breaking elongation | ASTM D638 | Percent | 2.06 | 1.6 | 1.40 |
| Modulus of elasticity | ASTM D638 | Kg./sq.cm | 33,000 | 32,500 | 35,000 |
| Tensile strength | ASTM D638 | Kg./sq.cm | 655 | 630 | 425 |
| Bending strength | ASTM D790 | Kg./sq.cm | 1,010 | 1,020 | 840 |
| Compressive strength | ASTM D695 | Kg./sq.cm | 890 | 955 | 830 |
| Impact bending strength Izod, with notch | ASTM D256 | kg.×cm./cm. of notch | 2.58 | 2.61 | 1.8 |

The process according to a practical form of the invention, hereinbefore referred to, is illustrated in Example 11 and Table III.

EXAMPLE 11

71 kg. of dimethyl itaconate are mixed with 119 kg. of styrene, 10 kg. of a copolymer previously made as described herein, are dissolved in said hot monomer mixture. The copolymer to be added might also be made by the copolymerization of a monomer mixture without the addition of polymer. The resulting mixture consists therefore of 35.5 percent of dimethyl itaconate, 59.5 percent of styrene and 5 percent of the polymer. 200 g. (for instance 1/1000) of benzoyl peroxide are added thereto. Such mixture, after having been poured into suitable containers, is heated to 70° C. for 48 hours.

This already yields a copolymer with good properties. To obtain a further decrease in the volatile matter content, the already polymerized mass is further heated at 110°–120° C. for 12 hours. Changes might be made in the abovestated times and temperatures. Thus, the polymerization time may last from 24 to 96 hours instead of 48 hours, and the temperatures can be between 60° and 90° C. The second treatment might be performed at temperatures in the range of 100°–150° C., and for times ranging from 3 to 24 hours.

Table III shows the properties of a copolymer obtained according to Example 11 compared with those of a copolymer obtained by polymerizing the same monomer mixture, with the same catalyst, without any addition of previously made polymer, for a time of 4 days at 70° C. The methods employed are stated in the table.

Table III

| | Method | Unit | Polymer obtained according to Example 11 | Binary copolymer of Table II |
|---|---|---|---|---|
| Relative viscosity (0.5% concentration) | Dimethylformanide solution | | 1.29 | 1.25 |
| Melting index | ASTM D1238 | Gr./10′ | 0.11 | 0.2 |
| Heat distortion temperature (66 p.s.i.) | ASTM D648 | ° C | 103 | 95 |
| Vicat softening point | ASTM D1525 | ° C | 113 | 92 |
| Specific weight | ASTM D792 | Kg./cu.dm | 1.14 | 1.14 |
| Refractive index | ASTM D542 | $N_D 20$ | 1.56 | 1.559 |
| Transparence (spectrophotometer) | Spectrophotometric | Percent | 85 | 85 |
| Rockwell hardness | ASTM D785 | M scale | 88 | 85 |
| Ultimate tensile strength | ASTM D638 | Kg./cu. cm | 585 | 435 |
| Ultimate elongation | ASTM D638 | Percent | 1.66 | 1.40 |
| Modulus of elasticity | ASTM D638 | Kg./sq. cm | 31,000 | 35,000 |
| Bending strength | ASTM D790 | Kg./sq. cm | 950 | 840 |
| Compressive strength | ASTM D695 | Kg./sq. cm | 935 | 830 |
| Impact bending strength (Izod with notch) | ASTM D256 | kg. × cm / cm. of notch | 2.22 | 1.8 |

The polmerization can always be carried out using another peroxide, specially lauryl peroxide, in place of benzoyl peroxide, or vice versa, and the amount of catalyst is always in the stated range of about 0.05–1 percent, but benzoyl peroxide is preferably used in amounts close to 0.05–1 percent, while lauryl peroxide is employed in somewhat larger amounts such as 0.2–1 percent. When no catalyst is used, higher temperatures or larger times are required.

While a number of examples have been given, these are not limitative as many changes and adaptations may be made therein by persons skilled in the art without departing from the invention or exceeding the scope of the appended claims:

What we claim is:

1. A process for copolymerizing styrene and dimethyl itaconite comprising mixing styrene in the amount of 30 to 90 parts by weight and dimethyl itaconate in the amount of 70 to 10 parts by weight and acrylonitrile in the amount of 1 to 30% by weight of styrene and dimethyl itaconate and heating the resulting mixture at temperatures in the range of from about 60 to 150° C. for a period of time of at least about 24 hours.

2. A process as claimed in claim 1 wherein said copolymerization is conducted in the presence of a catalyst selected from the group consisting of benzoyl peroxide and lauryl peroxide.

3. A process as claimed in claim 1 comprising adding a relatively small amount of the copolymeric product of the polymerization of a mixture of styrene in the amount of 30 to 90 parts by weight and dimethyl itaconate in the amount of 70 to 10 parts by weight to the mixture of styrene and dimethyl itaconate.

4. A process as claimed in claim 3 comprising a first heating of the resulting mixture at temperatures in the range of 60 to 90° C. for 24 to 96 hours and a second heating thereafter at temperatures in the range of 100 to 150° C. for 3 to 24 hours.

5. A process as claimed in claim 3 wherein said copolymeric product is present in the amount of 2 to 20% by weight of the resulting mixture of styrene, dimethyl itaconate, and copolymeric product.

6. A resinous transparent copolymer obtained by copolymerizing a mixture of styrene, dimethyl itaconate, and acrylonitrile, said acrylonitrile being present in the amount of 1 to 30% by weight of styrene and dimethyl itaconate and the remainder of said mixture being constituted by 30 to 90 parts by weight of styrene and 70 to 10 parts by weight of dimethyl itaconae, said copolymer having a melting point of at least about 125° C. and a viscosity of no more than about 2.8.

7. A copolymer as claimed in claim 6 wherein said acrylonitrile is present in the amount of 5 to 10% by weight of styrene and dimethyl itaconite.

8. A process for copolymerizing styrene and dimethyl itaconate comprising mixing styrene in the amount of 30 to 90 parts by weight, dimethyl itaconate in the amount of 70 to 10 parts by weight and acrylonitrile in the amount of 1 to 30% by weight of styrene and dimethyl itaconate and heating the resulting mixture in the presence of a peroxide catalyst between about 40° to 90° C. for about 72 hours and then between about 60° to 120° C. for at least 48 hours.

9. A process as claimed in claim 8 wherein said resulting mixture is heated between about 40° to 70° C. for about 24 hours, then between about 40° to 90° C. for about 36 hours, then between about 50° to 90° C. for about 12 hours, then between 60° to 120° C. for about 24 hours and finally between about 80° to 120° for at least 12 hours.

10. A resinous terpolymer of acrylonitrile, styrene and dimethyl itaconate.

(References on following page)

References Cited in the file of this patent

UNITED STATES PATENTS

| | | |
|---|---|---|
| 2,047,398 | Voss et al. | July 14, 1936 |
| 2,279,883 | D'Alelio | Apr. 14, 1942 |
| 2,391,393 | Coffman et al. | Dec. 25, 1945 |
| 2,485,277 | Gilbert | Oct. 18, 1949 |
| 2,574,847 | Schertz | Nov. 13, 1951 |
| 2,675,370 | Barrett | Apr. 13, 1954 |
| 2,771,459 | Banes et al. | Nov. 20, 1956 |
| 2,829,128 | Slocombe et al. | Apr. 1, 1958 |
| 2,938,887 | Weiss | May 31, 1960 |
| 2,947,123 | Ketterer | Mar. 7, 1961 |

FOREIGN PATENTS

| | | |
|---|---|---|
| 576,927 | Canada | June 2, 1959 |